Patented June 29, 1937

2,085,429

UNITED STATES PATENT OFFICE 2,085,429

PREPARATION OF PHENOL

Ernst Herdieckerhoff, Opladen, Germany, assignor to I. G. Farbenindustrie Aktiengesellschaft, Frankfort-on-the-Main, Germany No Drawing. Application August 13, 1936, Serial No. 95,848. In Germany August 15, 1935

4 Claims. (Cl. 260—154)

The present invention relates to the preparation of phenol from chloro-benzene.

In the preparation of phenol the methods in current commercial use are those wherein either the alkali metal salts of benzene sulfonic acid are fused with an alkali metal hydroxide, or chlorobenzene is hydrolized by a caustic alkali in an aqueous medium, such as by a sodium hydroxide solution. Attempts at the replacing in the latter process of sodium hydroxide by calcium hydroxide have never resulted in a commmercial development of the process involved. One method for hydrolizing chlorobenzene by means of calcium hydroxide is described in Example 1 of German Patent No. 288,116. In that case the reaction temperature is about 240° C., potassium iodide being added as catalyst. The other reference to the use of calcium hydroxide is to be found in "Berichte der Deutschen Chemischen Gesellschaft", volume 47, page 3155 et sequ., wherein there is stated that calcium hydroxide is unsuitable for the purpose in question.

One object of my invention is the determination of factors which have heretofore made it impossible to employ calcium hydroxide as hydrolyzing agent in technical scale. I have found that the reason for this failure is the fact that the hydrolysis of chlorobenzene under the influence of calcium hydroxide requires the application of relatively high temperatures and that considerable quantities of diphenylether are formed as by-products if the reaction is started at all. As diphenylether must be considered as a by-product it materially handicaps the commercial application of the process.

Another object of my invention is the development of a process by which the benzene is obtained in a good yield and the undesirable formation of diphenylether is avoided to a far reaching extent. With these and other objects in view my invention resides in a process of preparing phenol from chlorobenzene by hydrolysis by means of calcium hydroxide in an aqueous medium wherein the reaction temperature is above about 300° C. and the calcium hydroxide is employed in an amount of less than one mol. calculated on one mol. of chlorobenzene in the reaction mixture. I prefer to work in a dilute aqueous medium as this feature cooperates with the feature of avoiding an excess of calcium hydroxide in a decrease of the amount of diphenylether formed. The following figures serve to illustrate how the yield of diphenylether is influenced by the concentration of the reaction mixture and the amount of calcium hydroxide:

| Water (in gs) | Chlorobenzene (in gs) | Calcium hydroxide (in mols per one mol. of chlorobenzene) | Amount of diphenylether formed (in percent of the amount of phenol) |
|---|---|---|---|
| 1000 | 200 | 1 | 32 |
| 1000 | 200 | 0.55–0.60 | 21 |
| 1000 | 150 | 0.60 | 18 |

Another advantage involved by the use of calcium hydroxide in an amount less than the theoretical amount lies in the fact that the calcium hydroxide is completely converted into calcium chloride. In consequence thereof, a clear solution is obtained and the addition of acid in order to neutralize the excess calcium hydroxide can be dispensed with.

This process can be performed in a continuous or discontinuous manner. Copper or copper salts can be added as catalysts. The reaction temperature is preferably between about 320° C. and about 400° C. The water is preferably employed in an amount of about 5 to 8 times the weight of the chlorobenzene.

The effect involved by the decrease of the amount of calcium hydroxide is the more surprising as in case of alkali metal hydroxides the yield of phenol decreases and the yield of diphenylether increases if less than two mols of the alkali metal hydroxide are employed per each one mol. of chlorobenzene.

The following examples illustrate the invention without, however, restricting it thereto.

Example 1

200 kilograms of chlorobenzene are heated to about 350° C. for several hours together with 75 kilograms of calcium hydroxide in 1000 litres of water with or without the addition of copper or copper salts serving as catalysts. In a yield of about 95% a reaction product is obtained which contains 21 parts of diphenylether per 100 parts of phenol.

Example 2

160 kilograms of chlorobenzene are heated to about 350–360° C. for several hours together with 60 kilograms of calcium hydroxide in 1200 litres of water with or without the addition of copper. In a nearly quantitative yield a reaction product is obtained which contains 18 parts of diphenylether per 100 parts of phenol.

I claim:—

1. The process which comprises causing calcium hydroxide to react in an aqueous medium upon chlorobenzene at a temperature above about 300° C., the calcium hydroxide being employed in an amount of less than one mol. per mol. of chlorobenzene.

2. The process as claimed in claim 1 wherein calcium hydroxide is employed in an amount of about 0.6 mol. per mol. of chlorobenzene.

3. The process as claimed in claim 1 wherein the water is employed in an amount of about 5 to 8 times the weight of the chlorobenzene.

4. The process as claimed in claim 1 wherein the reaction temperature is about 350 to about 360° C.

ERNST HERDIECKERHOFF.